US010577262B2

(12) United States Patent
Cronce et al.

(10) Patent No.: US 10,577,262 B2
(45) Date of Patent: Mar. 3, 2020

(54) HIGH VOLUME WATER ELECTROLYZING SYSTEM AND METHOD OF USING

(71) Applicant: Spraying Systems Co., Wheaton, IL (US)

(72) Inventors: Keith L. Cronce, Roselle, IL (US); John Tyler Williams, Indianapolis, IN (US); Robert Adams, St. Charles, IL (US)

(*) Notice: Subject to any disclaimer, the term of this patent is extended or adjusted under 35 U.S.C. 154(b) by 535 days.

(21) Appl. No.: 15/180,853

(22) Filed: Jun. 13, 2016

(65) Prior Publication Data

US 2016/0362312 A1    Dec. 15, 2016

Related U.S. Application Data

(60) Provisional application No. 62/174,791, filed on Jun. 12, 2015.

(51) Int. Cl.
| | |
|---|---|
| *C25B 15/08* | (2006.01) |
| *C25B 15/02* | (2006.01) |
| *C25B 9/02* | (2006.01) |
| *C25B 9/06* | (2006.01) |
| *C25D 17/00* | (2006.01) |
| *C25D 17/10* | (2006.01) |
| *C02F 1/461* | (2006.01) |
| *C25B 9/08* | (2006.01) |
| *C25B 1/04* | (2006.01) |

(52) U.S. Cl.
CPC ............. *C02F 1/4618* (2013.01); *C25B 1/04* (2013.01); *C25B 9/08* (2013.01); *C02F 2201/4618* (2013.01); *C02F 2201/46115* (2013.01); *C02F 2301/024* (2013.01); *Y02E 60/366* (2013.01)

(58) Field of Classification Search
CPC ........... C25B 15/08; C25B 9/10; C25B 15/02; C25B 11/035; C25B 9/02; C25B 9/06; C25D 17/002; C25D 17/00; C25D 17/10
USPC ......................................................... 204/263
See application file for complete search history.

(56) References Cited

U.S. PATENT DOCUMENTS

| | | |
|---|---|---|
| 4,822,460 A | 4/1989 | Beaver |
| 5,954,935 A | 9/1999 | Neumeister et al. |
| | (Continued) | |

FOREIGN PATENT DOCUMENTS

WO    WO 2010/093716 A1    8/2010

*Primary Examiner* — Zulmariam Mendez
(74) *Attorney, Agent, or Firm* — Leydig, Voit & Mayer, Ltd.

(57) ABSTRACT

An electrolyzing system is provided for producing higher quantities of electrolyzed waters within prescribed pH ranges for optimum usage and which can be operated for producing greater quantities of alkaline electrolyzed water than acidic electrolyzed water consistent with a users requirements. The system includes an electrolytic cartridge having cathode and anode cells each comprising a pair of electrodes disposed in laterally spaced coplanar relation to each other, with a respective ion permeable membrane in spaced relation to the pairs of electrodes. The cells are separated with a common separator plate that maintains the ion permeable membranes in parallel relation with the respective electrodes and which facilitates the communication of brine solution from a brine bath to both cells. The cells further can be operate with staggered input currents and the redirection of electrolyzed water between the cells for optimum control of pH levels of the resulting products.

21 Claims, 15 Drawing Sheets

(56) References Cited

U.S. PATENT DOCUMENTS

| 8,753,489 B2 | 6/2014 | Swartz et al. |
| 2008/0041717 A1 | 2/2008 | Tremblay et al. |
| 2011/0259760 A1 | 10/2011 | Swartz et al. |
| 2014/0202849 A1 | 7/2014 | Halterman |
| 2014/0202872 A1* | 7/2014 | Swartz ............... C02F 1/4618 205/345 |

* cited by examiner

HIGH VOLUME WATER ELECTROLYZING SYSTEM AND METHOD OF USING

CROSS-REFERENCE TO RELATED APPLICATION

This patent application claims the benefit of U.S. Provisional Patent Application No. 62/174,791, filed Jun. 12, 2015, which is incorporated by reference.

FIELD OF THE INVENTION

The present invention relates generally to systems for producing electrochemically activated solutions (e.g., electrolyzed water) for simultaneously producing alkaline electrolyzed water and acidic electrolyzed water.

BACKGROUND OF THE INVENTION

Systems are known that electrolyze water containing ionic species (e.g., alkali salts) to produce acidic electrolyzed water and alkaline electrolyzed water. Acidic electrolyzed water can be is a strong sterilizing agent that is increasingly used in a variety of sanitizing applications including in the medical, agricultural and food processing industries and in other institutional environments. The alkaline or basic electrolyzed water also has a detergent effect and is useful in many cleaning applications. Sodium chloride is commonly used as the alkali salt that is dissolved in the water because it produces acids and bases that are environmentally friendly, potent and low in cost.

Commercially available electrolyzing water systems have a number of drawbacks. Large commercial users of such systems can require significant quantities of electrolyzed water on a daily basis. Since most available electrolyzing systems are relatively slow in processing the electrolyzed alkaline and acidic water, producing large quantities can be tedious and time consuming, sometimes resulting in inadequate supply for the commercial needs. While increased production can be achieved by increasing the number of electrolyzing cell pairs pursuant to existing cell designs, such approach proportionally increases the cost of the system. Moreover, many commercial users require significantly more alkaline cleaners than acid sanitizers. Since both are electrolyzed simultaneously, to produce sufficient quantities of the cleaner, excessive amounts of the sanitizer produced often must be discarded.

The contents (e.g., impurities) of water directed to the electrolyzer system can further effect the quality of the processed alkaline and acidic electrolyzed water. Under some conditions, to achieve an optimum pH of the alkaline cleaner, the acidic electrolyzed water (the sanitizer) can have such a low pH that the acid is unstable for safe or effective use. To correct that problem, the pH of the alkaline cleaner can be undesirably affected.

Moreover, if the ion permeable membranes of the electrolyzing cells of the system are not assembled and maintained in certain spatial relation (e.g., parallel relation) to the electrode plates, the electrolyzing process again can be altered. Similarly, if the pressure of liquid through the electrolyzer cell is increased in an effort to increase the processing rate, alignment of the membrane can be distorted with resulting inadequate ion exchange. The increased flow rate through the cell at higher liquid pressures further can limit the time for adequate ion exchange. Increasing the power supply to the electrode cells to increase production also can adversely affect the pH of the alkali or acidic electrolyzed waters.

OBJECTS AND SUMMARY OF THE INVENTION

It is an object of the present invention to provide an electrolyzing system that is operable for producing in an economical manner higher quantities of electrolyzed water within prescribed pH ranges for optimum usage.

Another object is to provide an electrolyzing system as characterized above that has an electrolyzer cell construction that enables increased production of electrolyzed water.

A further object is to provide an electrolyzing system of the foregoing type which is operable for producing greater quantities of alkaline electrolyzed water than acidic electrolyzed water, consistent with a user's requirements.

Yet another object is to provide an electrolyzing system of the above kind that can be controlled for producing alkaline electrolyzed water and acidic electrolyzed water with pH ranges for optimum usage notwithstanding the hardness or softness of input water to the system.

Still another object is to provide such an electrolyzing system which includes a water conditioning (e.g., softening, reverse osmosis) system for softening water prior to direction to an electrolyzer and in which the entire output from the softener is utilized for producing alkaline electrolyzed water and acidic electrolyzed water within optimum pH ranges.

Yet a further object is to provide an electrolyzing system of the foregoing type that is relatively simple in design and lends itself to economical manufacture.

Other objects and advantages of the invention will become apparent upon reading the following detailed description and upon reference to the drawings, in which:

Figure 1:
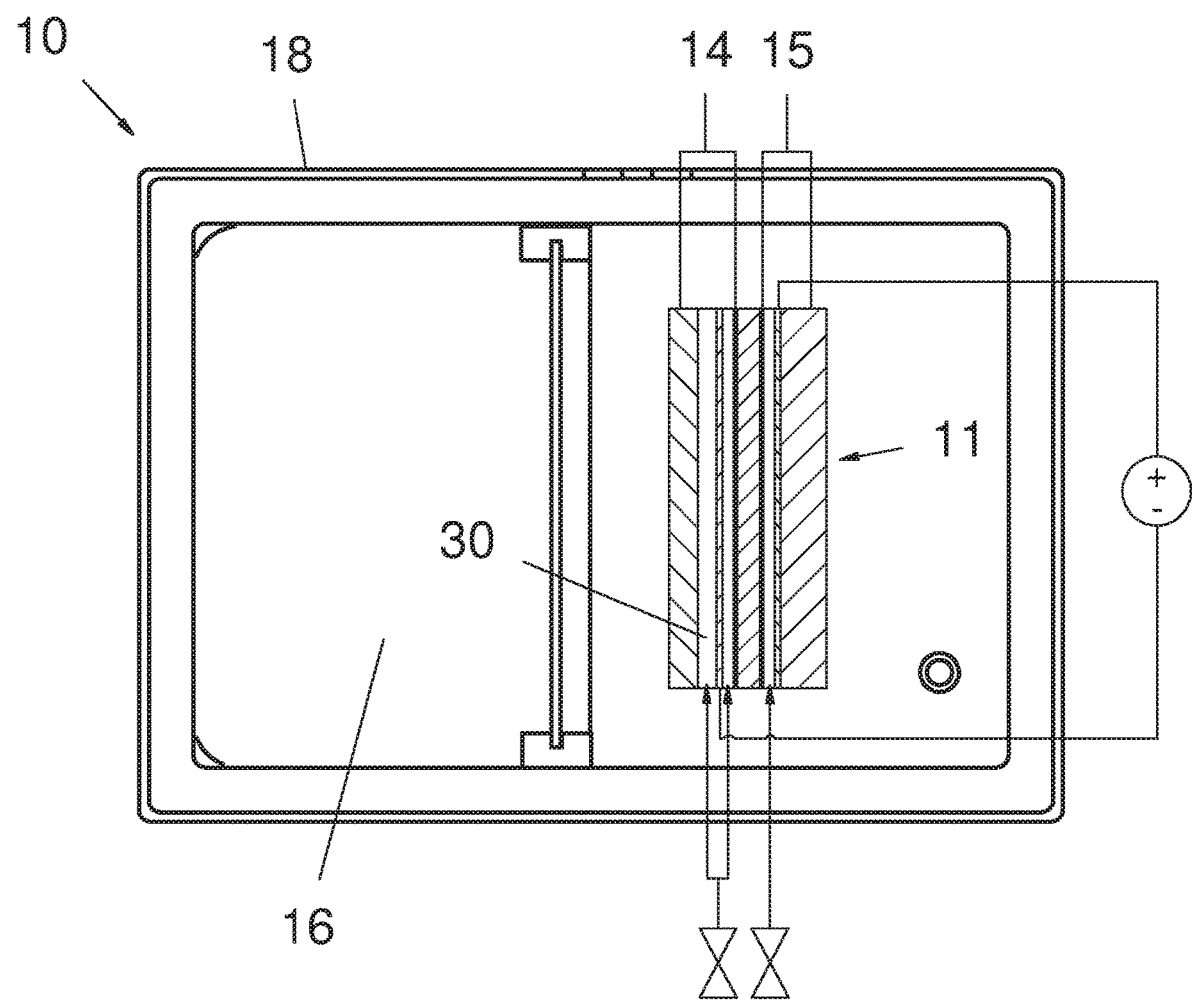
FIG. 1 is a diagrammatic depiction of an electrode cell cartridge embodying the present invention immersed in a brine bath.
Figure 2:
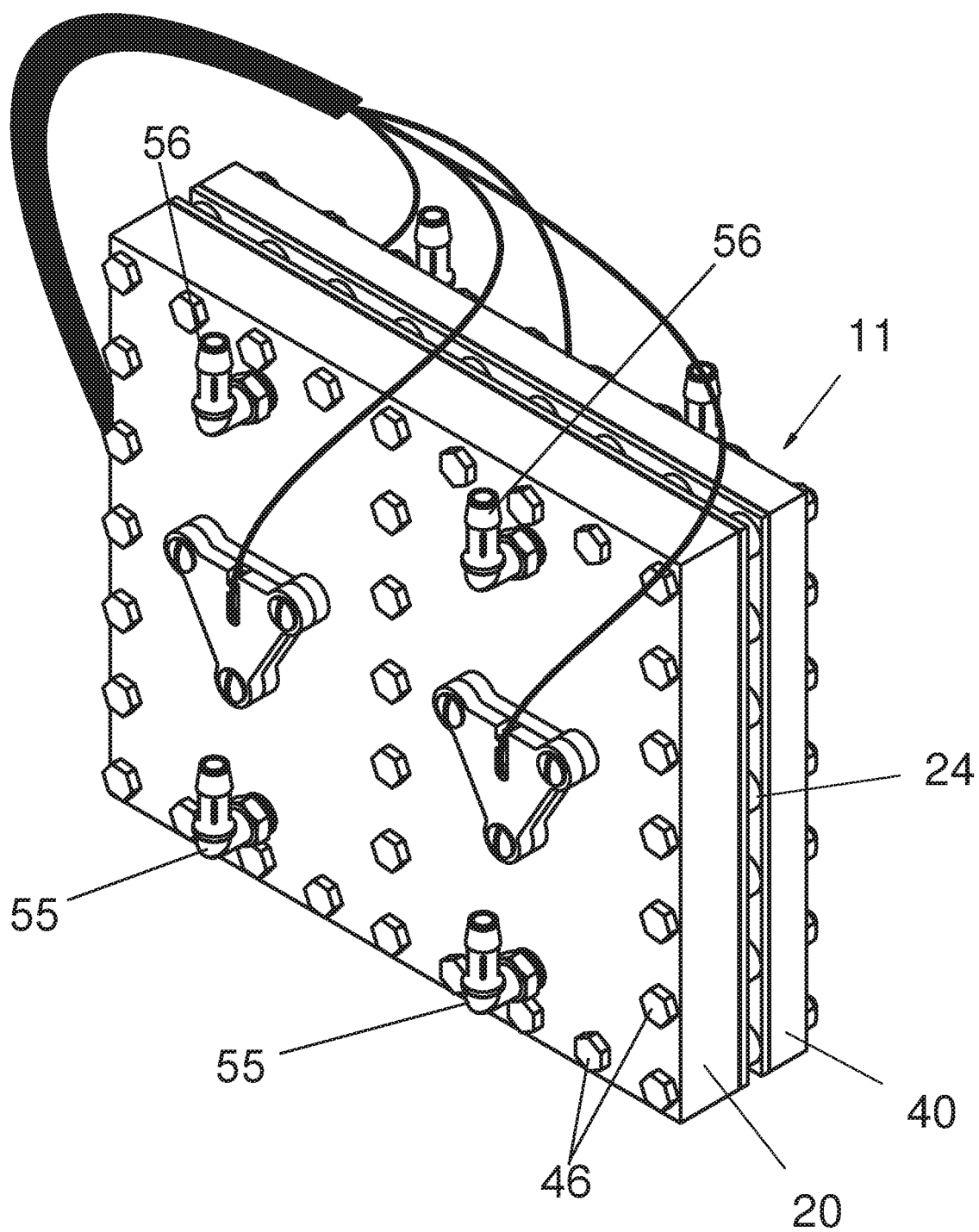
FIG. 2 is an enlarged perspective of the illustrated electrolyzing cell cartridge depicted in FIG. 1.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DESCRIPTION OF THE PREFERRED EMBODIMENTS

Referring now more particularly to FIGS. 1-14, of the drawings, there is shown an illustrative high volume electrolyzing system 10 according to the invention that is operable for electrolyzing a solution of water and salt (e.g., inorganic salt) to produce alkaline or base electrolyzed water and acidic electrolyzed water. The illustrated electrolyzing system 10 comprises a cartridge 11 that contains both cathode and anode electrolyzer cells 14, 15 respectively, immersed in an open brine bath 16 contained within a vessel 18.

Figure 3:
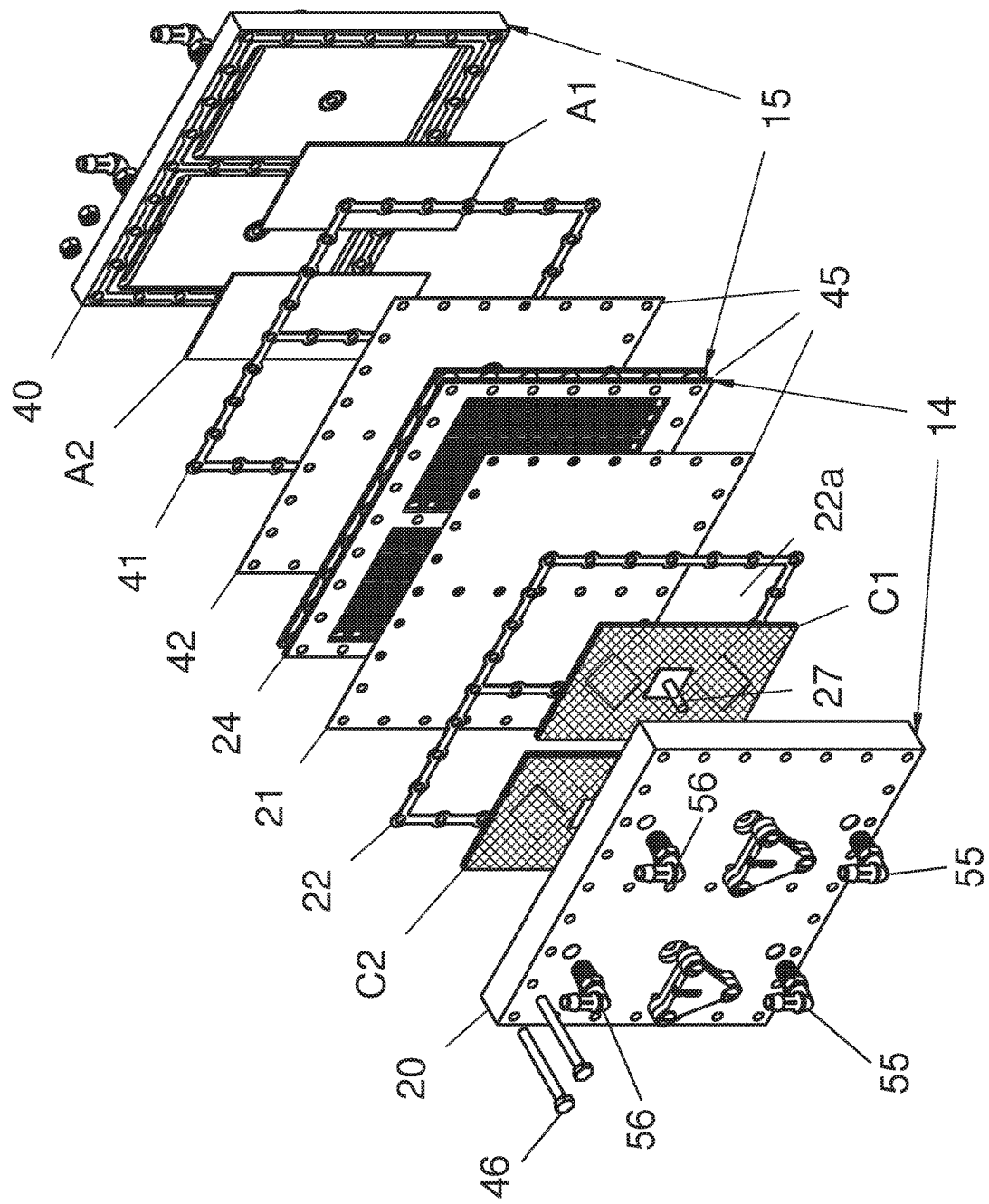
FIG. 3 is an exploded perspective of the cell cartridge shown in FIG. 2.
Figure 4:
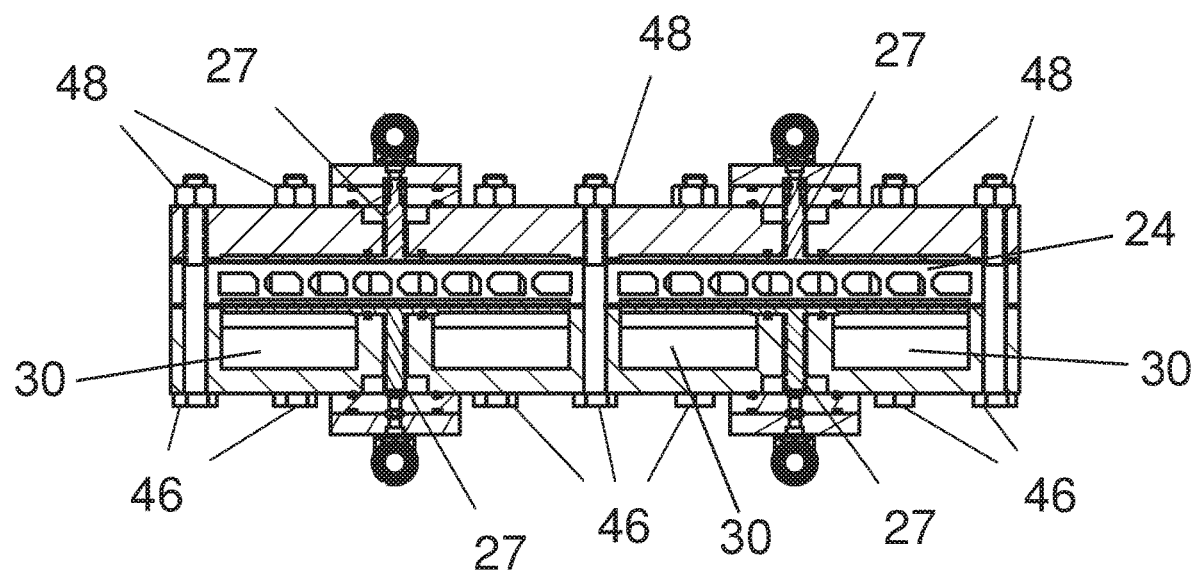
FIG. 4 is an enlarged diagrammatic vertical section perspective of an illustrated cell cartridge according to the invention.

In accordance with an important feature of this embodiment, the cathode electrolyzed cell 14 is designed to produce a high volume output of alkaline or base electrolyzed water while the anode electrolyzed cell 15 is operated to produce a smaller quantity of acidic electrolyzed water consistent with a user's needs. To this end, the illustrated cathode electrolyzer cell 14 comprises a pair of negatively chargeable cathode electrodes C1, C2, an electrode holder 20 within which the electrodes C1, C2 are mounted, a positive or cation ion exchange permeable membrane 21, a sealing gasket 22, and a divider and membrane support plate 24 (FIG. 3).

The cathode electrodes C1, C2, in this case are mounted in co-planar side by side relation adjacent respective chambers 23 (FIG. 6) in the electrode holder 20. The electrodes C1, C2 in this instance are supported with the peripheral edges of their adjacent sides in laterally spaced relation to each other. In order to increase surface area of the cathode electrodes C1, C2 for enhanced ion exchange during operation of the system, the electrodes C1, C2 each comprise a pair of titanium mesh plates 25 (FIG. 7) supported in close side by side parallel relation. Spacer plates 26 are welded between the two mesh plates 25 of each electrode C1, C2 for creating both a structural and electrical connection between the plates 26 while maintaining a consistent spacing. The electrodes C1, C2 each have a respective electrical connection stud 27 protruding outwardly from a central location of the electrode C1, C2 for attachment to a respective electrical cable and for providing power to the electrodes, as will become apparent. Each electrical connection stud 27 in this case is welded to a respective connector plate 28 which in turn is welded to an outer side of the mesh plate 26 of the cathode electrode C1, C2 facing the inner wall of the holder chamber 23. Each stud 27 in this case is externally threaded for facilitating coupling to an electric supply cable.

The electrode holder 20 is designed to support the cathode electrodes C1, C2 such that a pocket or space 30 (FIGS. 1, 4 and 5) exists between each cathode C1, C2 and an inner side wall of the electrode holder 20. Either or both cathode C1, C2 is supported by the respective electrical connection stud 27. In some embodiments, electrode holder 20 may further incorporate recessed ledges 32 (FIG. 6) for supporting top and bottom ends of the electrodes C1, C2 in predetermined spaced relation to the inner side wall of the cathode electrode holder 20. In such position, the electrical connection stud 27 of each electrode protrudes through a respective aperture centrally disposed within an adjacent side wall of the holder with an appropriate o-ring about the stud 27 for sealing the brine solution from entry into the cartridge 11. The gasket 22 in this case defines rectangular windows 22a surrounding the cathode electrodes C1, C2 effective for sealing the perimeter of the electrodes C1, C2 from each other and the outside brine bath, as will become apparent.

Figure 9:
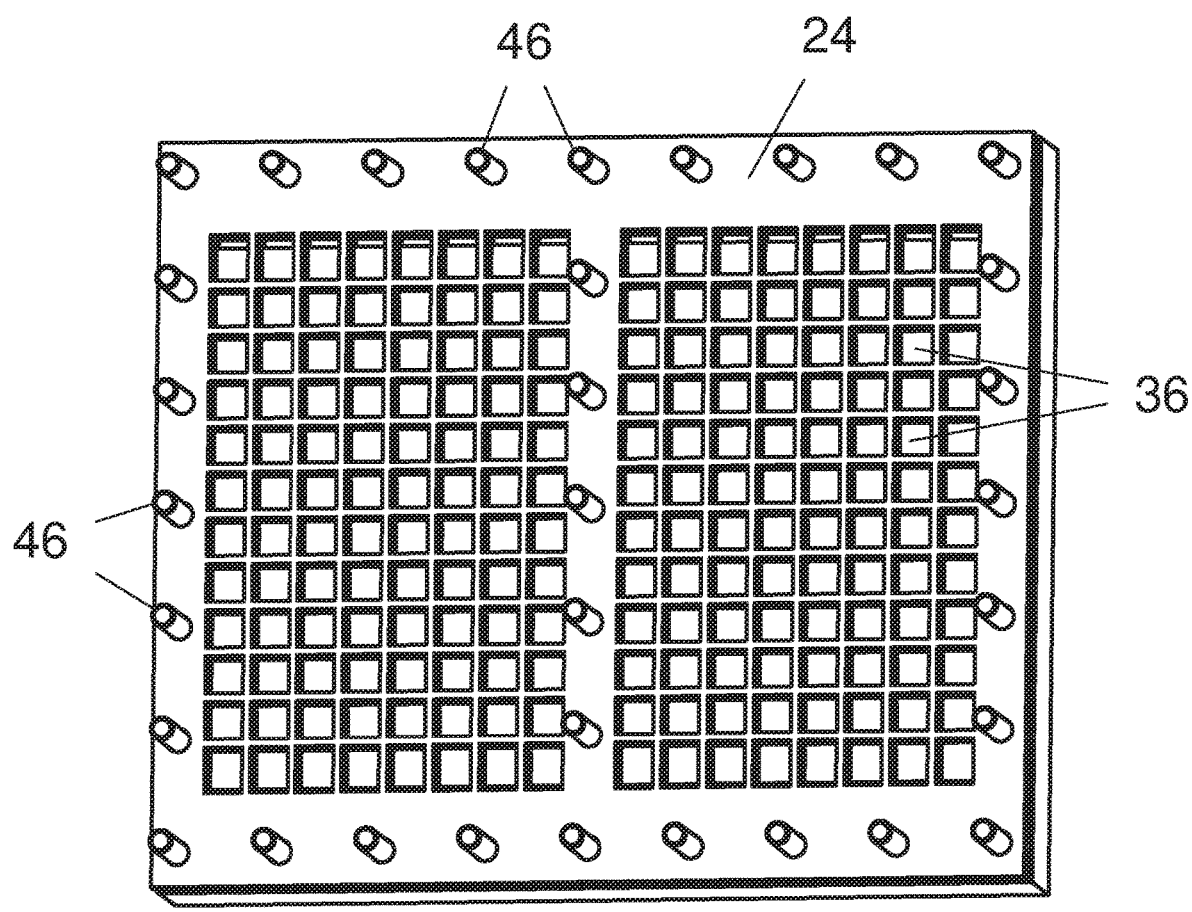
FIG. 9 is a perspective of the central center divider plate of the illustrative cell cartridge with fasteners diagrammatically depicted through fastening apertures of the divider plate.
Figure 10:
FIG. 10 is a side elevational view of the divider shown in FIG. 9.
Figure 11:
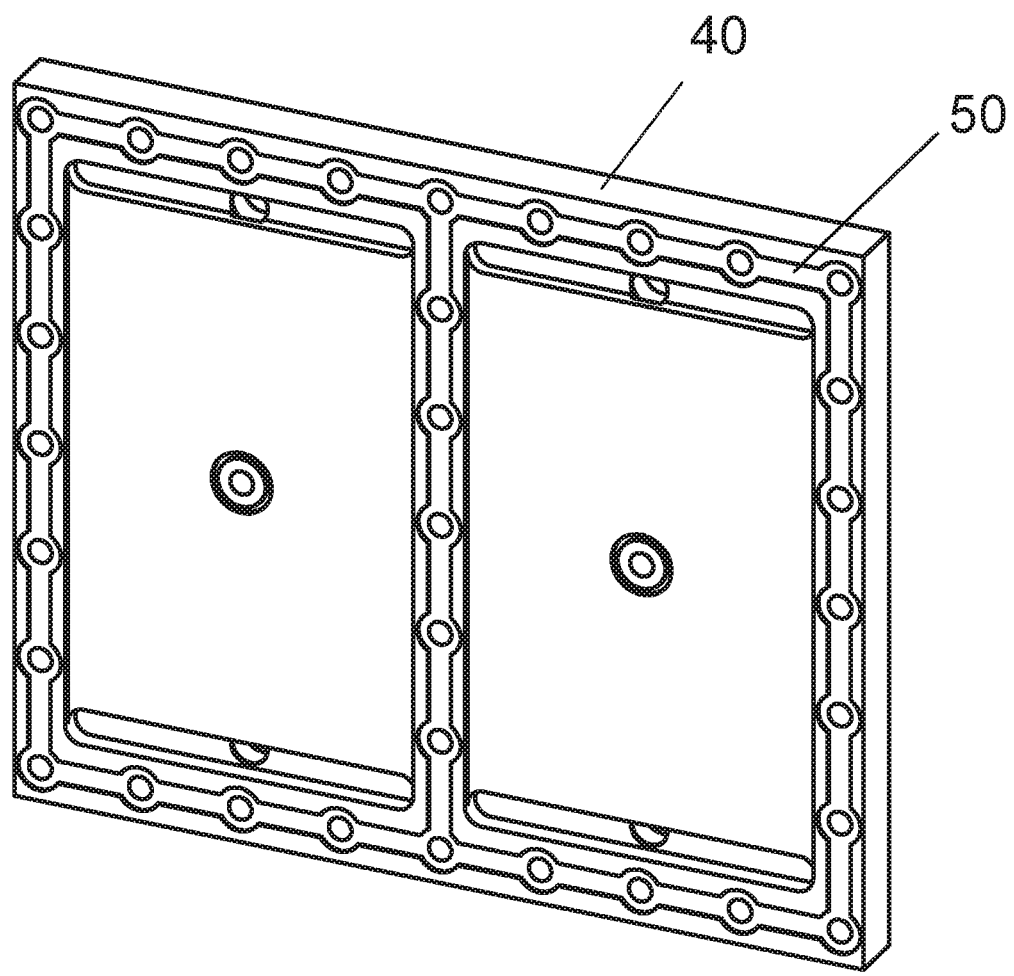
FIG. 11 is a perspective of an inner side of the holder for the anode cell of the illustrated cell cartridge.

The positive ion (i.e. cation) exchange membrane 21 may be hydrated prior to assembly and is maintained in certain spatial relation, for this instance, parallel relation, to the cathode electrode C1, C2 by the divider plate 24 which serves the dual purpose of capturing the membrane 21 in such a way that it cannot be pushed away from the electrodes C1, C2 due to internal cell pressures and which further provides flow passages to allow brine from the bath 16 to circulate between both the cathode cell 14 and anode cell 15. The divider plate 24 in this case, as depicted in FIGS. 9 and 10, has a grid structure which defines liquid flow passageways 35, 36 about the perimeter and the central area of the divider plate 24, respectively.

Figure 12:
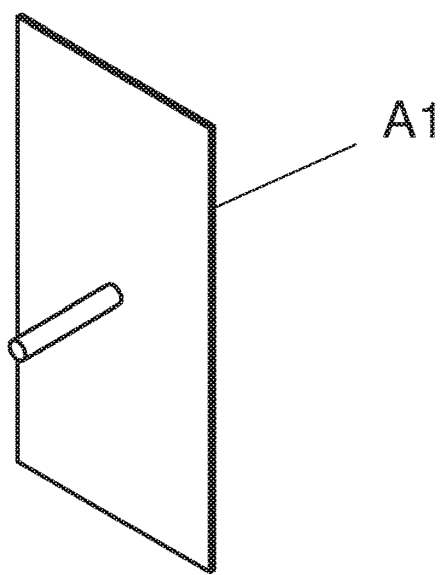
FIG. 12 is a perspective of one of the anode electrodes of the anode cell of the illustrated cell cartridge.
Figure 13:
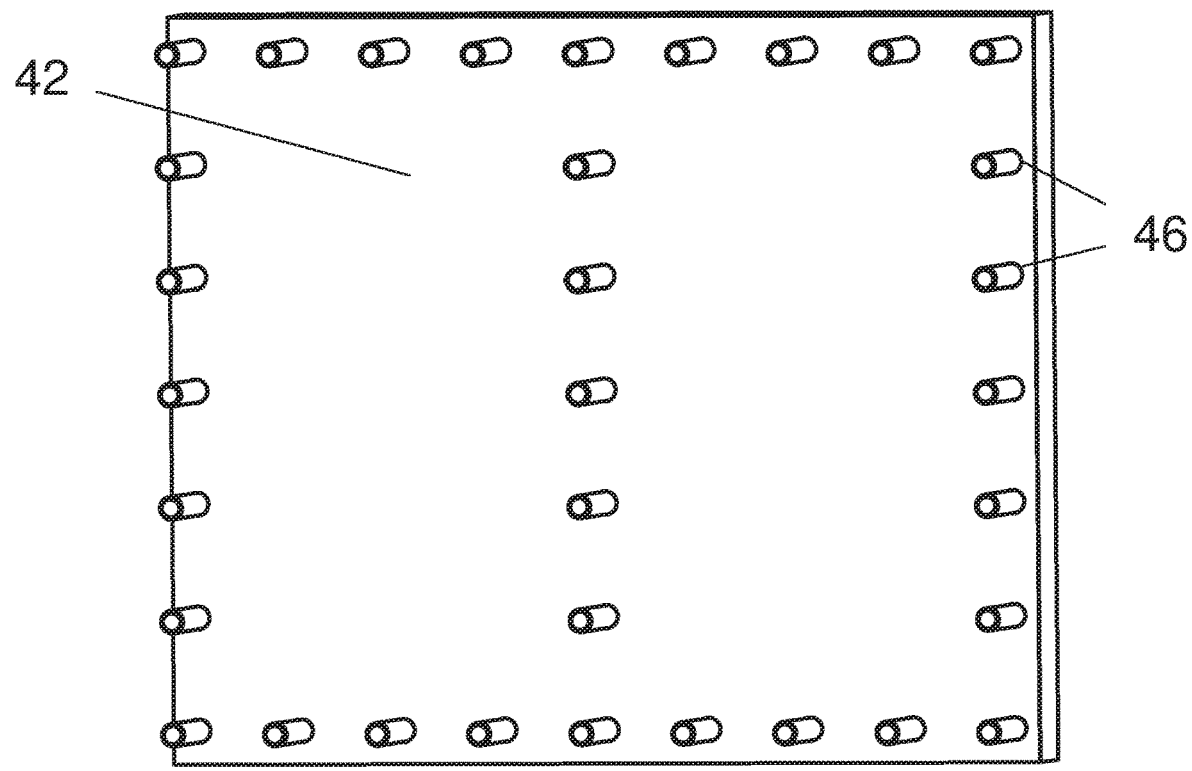
FIG. 13 is a perspective of the ion exchange membrane of the anode cell of the illustrative cell cartridge.
Figure 14:
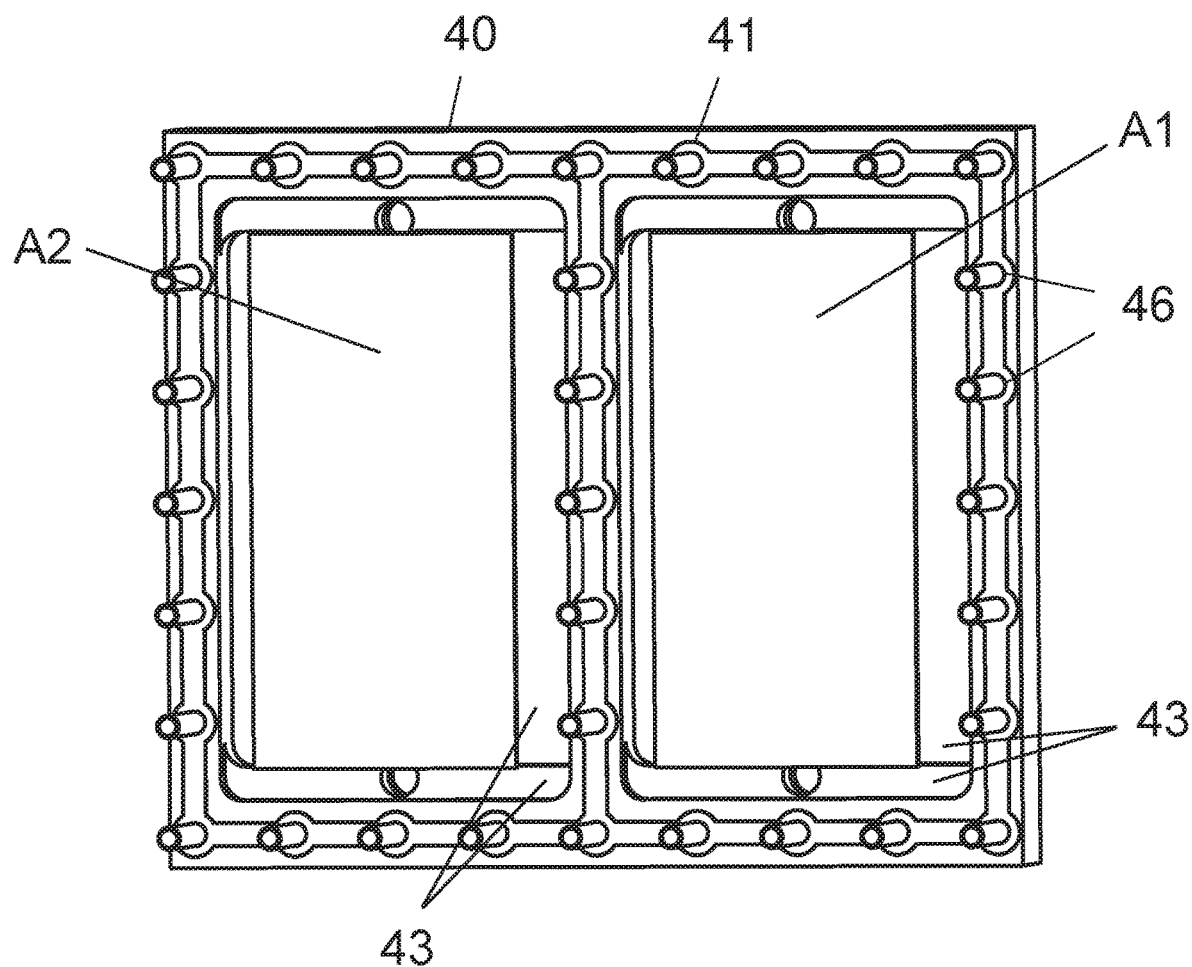
FIG. 14 is a side elevational view of the anode holder of the illustrative cell cartridge with a sealing gasket mounted thereon.

The anode cell 15, like the cathode cell 14, comprises a pair of electrodes A1, A2, in this case positively chargeable, an anode electrode holder 40, a gasket 41, and a negative or anion permeable membrane 42 positioned adjacent and supported by an opposite side of the divider plate 24 opposite the cathode membrane 21. The anode electrodes A1, A2 in this instance have an uninterrupted flat plate design, preferably coated titanium (FIG. 12). An electrical connecting stud similar to the cathode electrodes again is welded centrally on the side of each of electrode A1, A2 for positioning through a respective opening in a side wall of the anode electrode holder 40. An appropriate sealing ring again is disposed about the electrical connecting stud and the access opening in the holder.

Unlike the cathode electrodes C1, C2, the anode electrodes A1, A2 are mounted in immediately adjacent, contacting relation to the inner wall of an anode holder 40. A gasket 41, similar to the cathode gasket 22, defines windows for surrounding and sealing the anode electrodes A1, A2 individually within the holder 40. In certain embodiments of the systems, anode electrodes A1, A2 are sized so as to take up less than the entire space of the chamber of the holder 40 in which they are located, so as to define an auxiliary flow passage 43 (FIG. 14) about the outer perimeter of the anode electrodes A1, A2 to permit an auxiliary liquid flow for the purpose of aiding in stabilizing the pH of at least the acid, if not both products. Utilizing a smaller anode electrode allows water to pass between the anode electrodes A1, A2 and membrane 42, but also around the perimeter of the anode electrodes A1, A2 (i.e., a "combination flow"), thus allowing for greater flow without issues of pressure. The combination flow is believed to allow for the maintenance of the certain spatial relationship between the anode electrodes A1, A2 and the membrane 42 while allowing more dwell time for the fluid in the chamber, which in turn is believed to increase the free active chlorine in the acid and achieve a preferred pH of resulting product.

Figure 5:
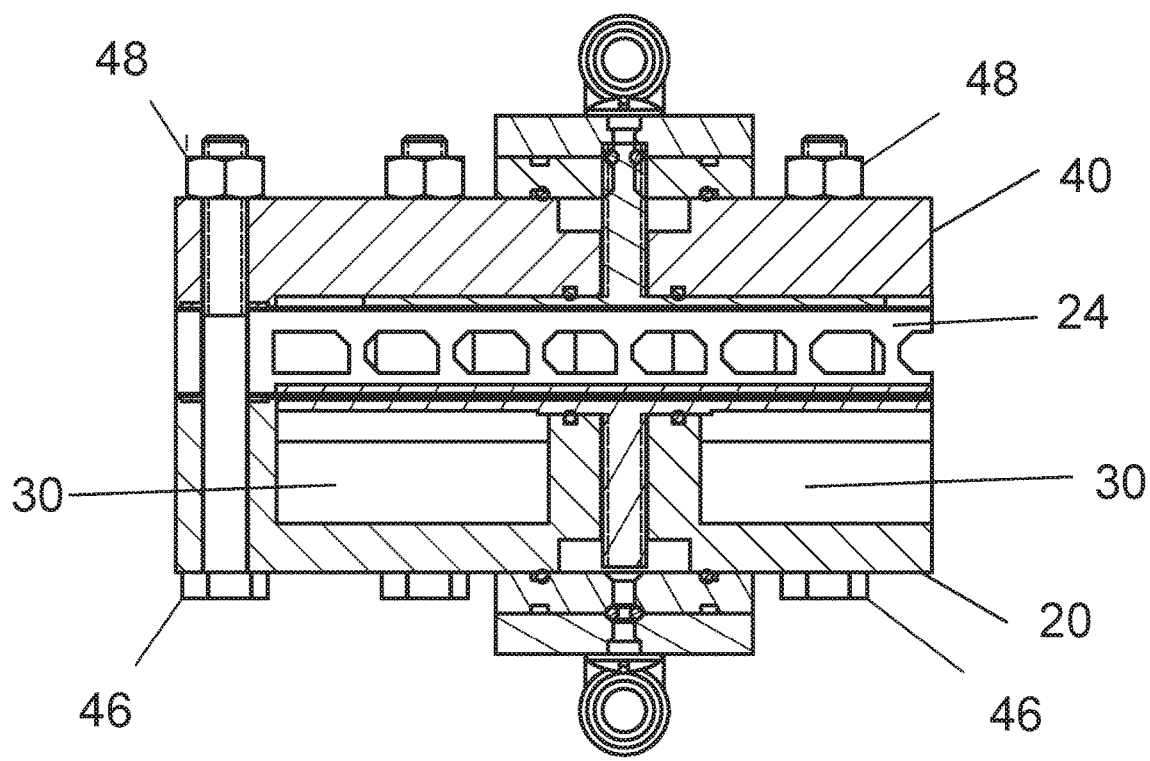
FIG. 5 is an enlarged fragmentary section of the cell cartridge shown in FIG. 4.
Figure 6:
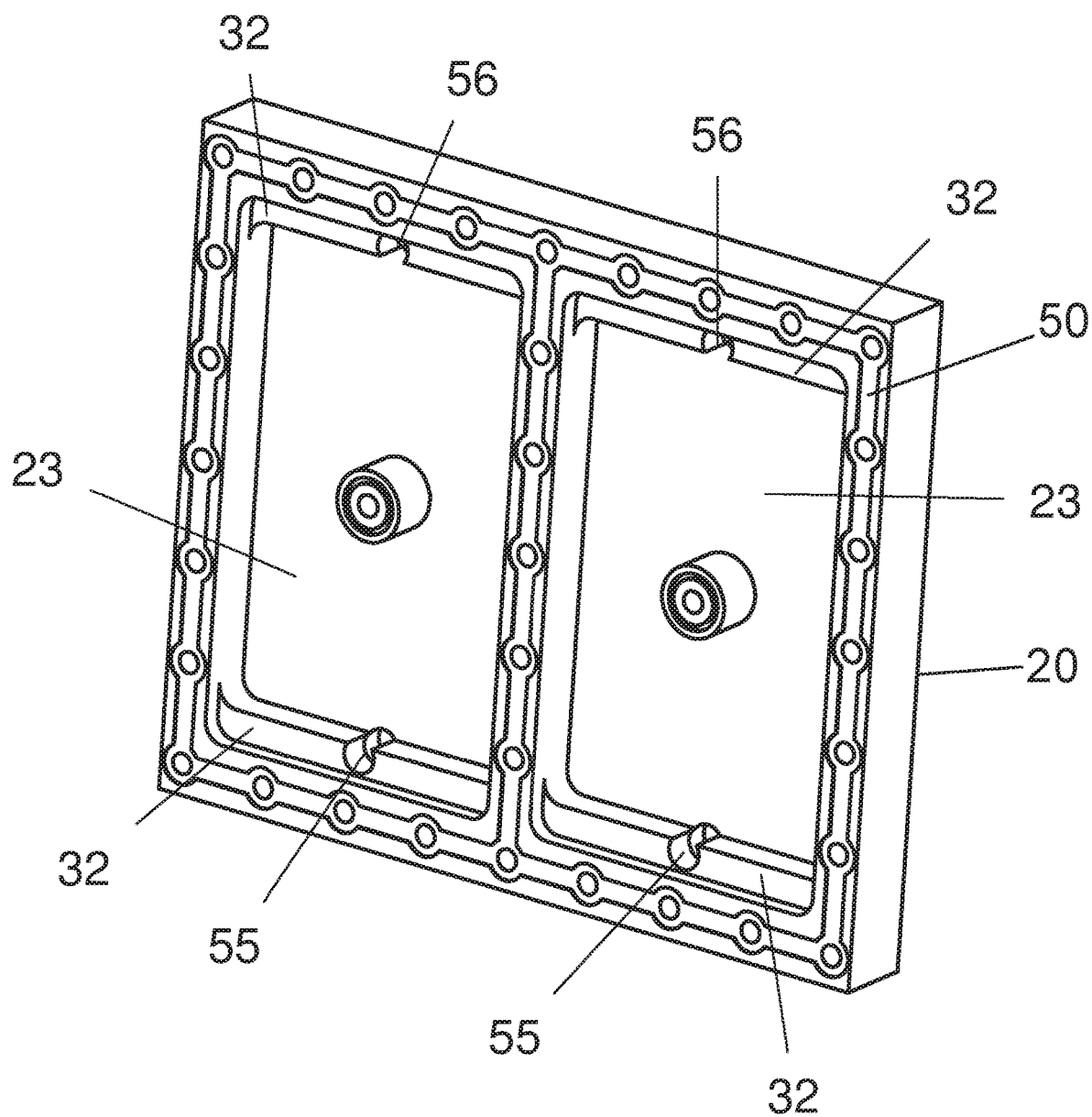
FIG. 6 is a plan of the inner side of the cathode electrode holder of the illustrative cell cartridge.
Figure 7:
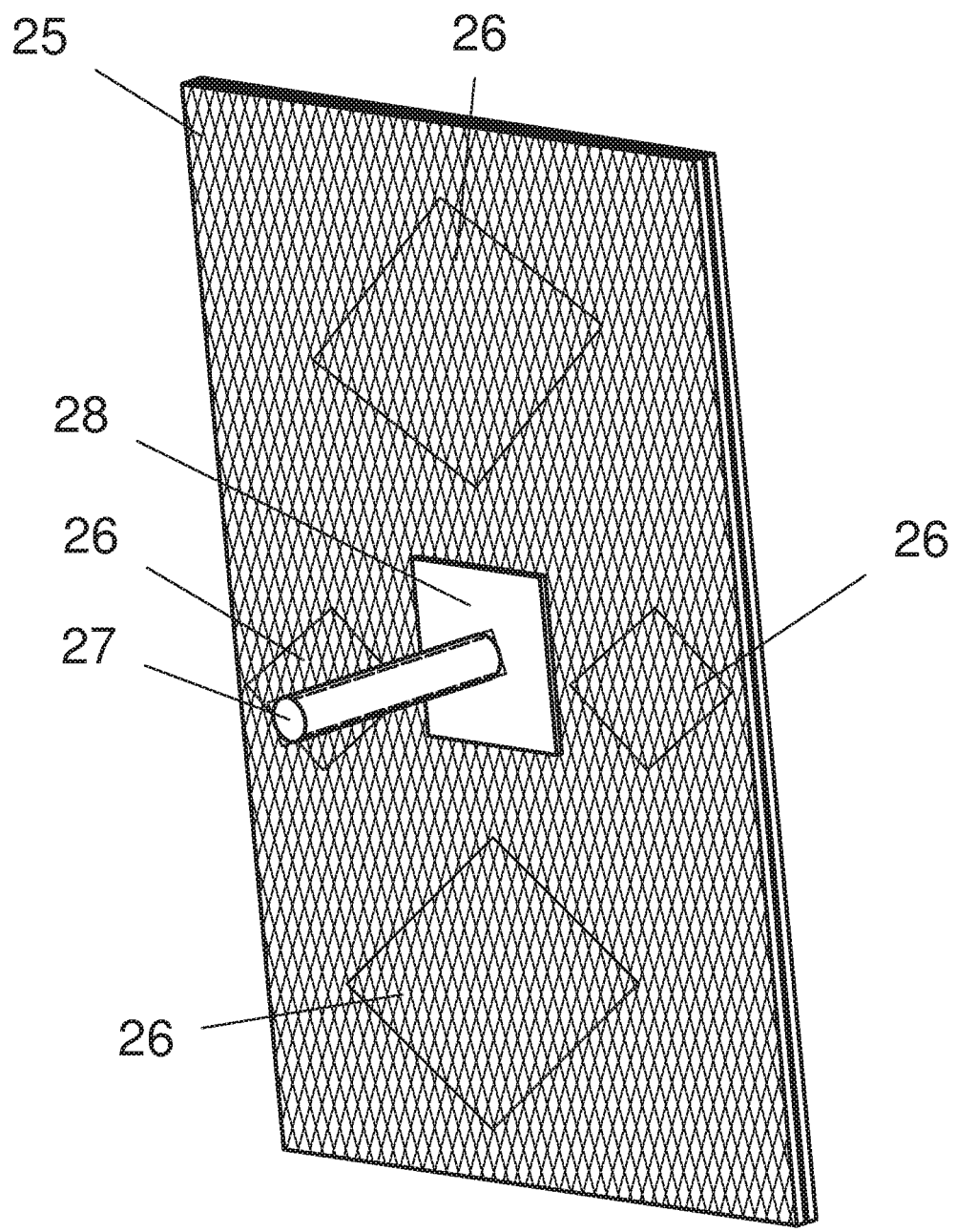
FIG. 7 is an enlarged perspective of one of the cathode electrodes of the illustrative cell cartridge.
Figure 8:
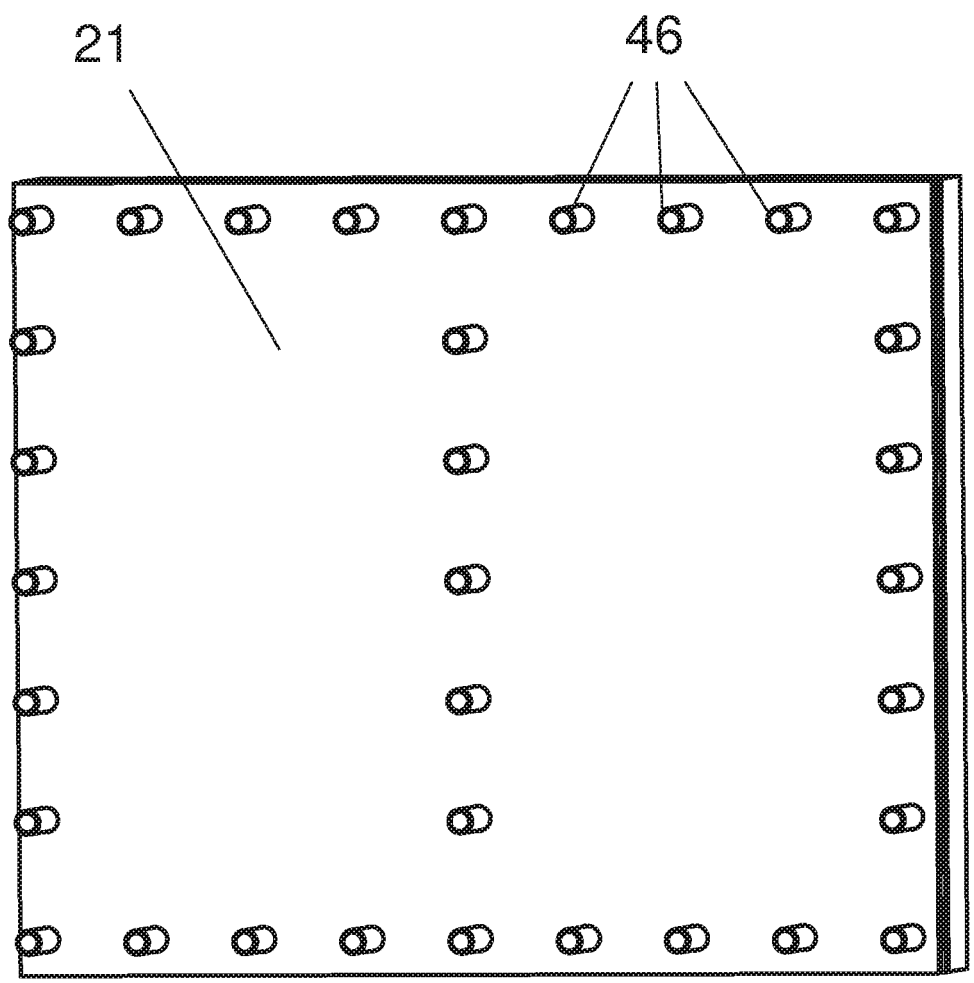
FIG. 8 is a perspective of the ion exchange membrane of the cathode cell of the illustrated cell cartridge.

In keeping with a further feature of the illustrated electrolyzer system 10, the cathode and anode cells 14, 15 are secured together to form a singular cartridge 11 for easy mounting within the brine bath 16 and efficient and reliable usage. To this end, the cathode and anode electrode holders 20, 40, membranes 21, 42, sealing gaskets 22, 41, and divider plate 24 are formed with rectangular arrays of aligned mounting bolt receiving apertures 45 surrounding the electrodes for receiving fastening bolts 46, preferably made of nylon or other non metallic material and secured by nylon fastening nuts 48 (FIG. 5). In assembled condition and during usage of the cartridge 11, the center divider plate 24 will maintain the membranes 21, 42 in parallel relation to the electrodes plates C1, C2, A1, A2 for optimum processing. "In parallel relation" may be used to describe the center divider plate and/or electrode plates that are flat and parallel, but also may be used to describe the center divider plate and/or electrode plates that have some curvature (one or more center divider plate and/or electrode plates) but are arranged in a manner that would be parallel in the absence of the curvature. To this end, the gaskets 22, 41 and their mountings are designed so as to ensure they do not impede parallel alignment of the cartridge components. The gaskets 22, 41 are formed of deformable material, such as silicone rubber, and each have a transverse thickness greater than the depth of receiving grooves 50 in the holders 20, 40 in which they are mounted. Upon securement of the cartridge components by the fastening bolts 46 the gaskets 22, 41 are transversely compressed completely within the receiving grooves 50. In such compressed condition, the gaskets 22, 41 effect reliable sealing about the assembled electrodes A1, A2, C1, C2, while ensuring that the gaskets 22, 41 do not present an uneven seating surface that could lead to non-parallel alignment of the cartridge components resulting from tightening of the retaining bolts 46 with different forces. In the illustrated embodiment, the receiving grooves may have a depth of 0.020 inches and the gaskets a thickness of 0.025 inches. Hence, the bolts 46 may be secured with a predetermined torque that assures both proper sealing contact and alignment of the components of the assembly, and particularly the alignment of the electrodes A1, A2, C1, C2 and the membranes 21, 42.

With the assembled cartridge 11 supported within the brine bath 16, the brine is permitted to circulate freely through the divider plate 24 for efficient ion exchange through the membranes 21, 42 on each side of the divider plate 24. A pair of water inlet ports 55 (FIG. 6) communicating through a side of the cathode holder 20 adjacent a bottom of the holder 20 enable water flow streams to progress separately through the chambers individually containing the cathode electrodes C1, C2. The electrode holder 20 similarly has a pair of outlet ports 56 adjacent a top of the holder through which processed electrolyzed alkaline water exits the cathode containing chambers of the holder 20. It will be appreciated that the passage of water in such upward directions avoids stagnant areas and gas buildup within the cathode chambers which can impede efficient in exchange.

Pursuant to another important feature of this embodiment, the pockets 30 (FIGS. 1, 4 and 5) defined between the inner wall of the cathode electrode holder 20 and the cathode electrodes C1, C2 allow for increased fluid flow through the cathode cell 14 with a dwell time in the cell for enhancing ion exchange from the circulating brine. This is done without increasing the critical spacing between the cathode electrodes C1, C2 and the membrane 21. Instead a portion of the liquid flow from the inlets 55 is able to bypass the small clearance spaces between the cathode electrodes C1, C2 and membrane 21, which otherwise could cause an increased pressure buildup, greater stresses on the membrane, and a higher flow velocity through the cell with insufficient dwell time for adequate ion exchange. In certain embodiments, the pockets 30 have a depth D of at least 2 times the spacing between the membrane and cathode electrodes, including at least 10 times the spacing between the membrane and cathode electrodes. In certain embodiments, the pockets 30 have a depth D of from about 2 times to about 100 times the spacing between the membrane and the cathode electrodes, including from about 10 times to about 50 times the spacing between the membrane and the cathode electrodes. In a typical embodiment, the spacing between the membrane and cathode electrode is 0.02 inches and the depth of the pocket is 0.5 inches.

As described herein, when immersed in brine solution of open brine bath 16 and provided with a source of fresh water and connected to direct-current power supplies, cartridge 11 can be utilized to produce acidic electrolyzed water and alkaline electrolyzed water. Fresh water (e.g., softened water) 130 enters cathode electrolyzed cell 14 so as to contact each cathode electrode C1, C2. When powered, positive ions (e.g., Na+) are drawn from brine solution of open brine bath 16, through cation ion exchange membranes 21, and into a flow of fresh water contacting cathode electrodes C1, C2.

The unique design of the cathode cell 14 has been found to enable the high flow production of a ready to use concentration of catholyte. From the foregoing, it can been seen that the cathode holder 20 is effective for retaining the cathode electrodes C1, C2 at an appropriate distance from the cation ion exchange membrane 21 for optimum electrical efficiency and catholyte concentration. The dual flow paths about the membrane 21 enable the highly concentrated catholyte produced between the cathode electrodes and membrane 21 to readily mix with the solution stream passing behind the cathode electrodes C1, C2. This effectively dilutes the catholyte to a ready to use concentration internally within the cathode cell 14. Thus, the user never has external access or exposure to the concentrated catholyte stream between the cathode electrodes C1, C2 and membrane 21. The relatively deeper pockets or chambers 30 behind the cathode electrodes C1, C2 also allows for a higher flow through the pockets or chambers 30 at a manageable pressure while increasing the dwell time that the solution remains in the chambers for a given flow, which in turn increases the concentration of the catholyte. The output ports 56 further can be designed to maintain the pressure within the cathode cell 14 at a manageable level.

The dual plate cathode electrode design maximizes the contact surface area between the electrode surfaces and the input water stream, which additionally increases the efficiency of the electrolyte production. The large electrode surface area per given amount of electrical energy applied and volume of water in turn facilitates creation of a higher concentration of catholyte. The expanded cathode plate metal surfaces further allow the input water stream to travel in the spaces between the cathode electrodes C1, C2 and membrane 21 and between the electrodes C1, C2 and the electrode holder 20. This permits the high concentration catholyte produced between the cathode electrodes C1, C2 and membrane 21 to readily mix with the solution stream passing behind the electrode plates, which effectively dilutes the catholyte to its ready to use state. The high concentration catholyte passes internally in the cathode cell 14 so, as indicated, the user never has external access to the high concentrated catholyte stream. The expanded metal electrode surfaces also introduce turbulence in the solution streams that limit the ability of hydrogen gas bubbles to accumulate on the cathode electrode surfaces. This effectively increases the efficiency of the catholyte production by maintaining maximum contact area of the solution with the cathode electrodes C1, C2. It also eliminates the ability of large gas bubbles to form which would potentially cause localized temperature increases and possible premature failure of the cathode cell.

The unique anode cell design allows for the specified flow of ready to use concentration anolyte at a pH preferably between 5 and 6. The anode electrode holder 40 again is designed to hold the anode electrodes A1, A2 at the appropriate distance from the negative or anion permeable membrane 42 for optimized electrical efficiency and anolyte concentration. The electrode holder 40 in this case creates a different dual flow path configuration that facilitates the high concentration anolyte produced between the anode electrodes A1, A2 and membrane 42 to readily mix with the solution stream passing through the auxiliary passages 43 about the outer perimeters of the anode electrodes A1, A2. This dual flow arrangement is achieved by the anode electrode holder having chambers wider than the electrodes (4 inches wide chamber v. 3 inches wide electrode) such that the dual or auxiliary flow streams through the auxiliary passages 43 effectively dilutes the anolyte to its ready to use concentration internally in the anode cell. Thus, the user again never has external access to the concentrated anolyte stream. The anode cell 15 enables anolyte pH control by readily mixing the low pH stream located between the anode electrodes A1, A2 and membrane 42 with the higher pH stream passing about the perimeter of the anode electrodes A1, A2. Thus the user does not have external access to an anolyte stream that is not between the preferred pH range of 5 and 6. The auxiliary flow streams further decrease the pressure within the anode cell 15 by increasing the cross sectional area of the flow stream without affecting the critical membrane and anode electrode spacing.

Figure 15:
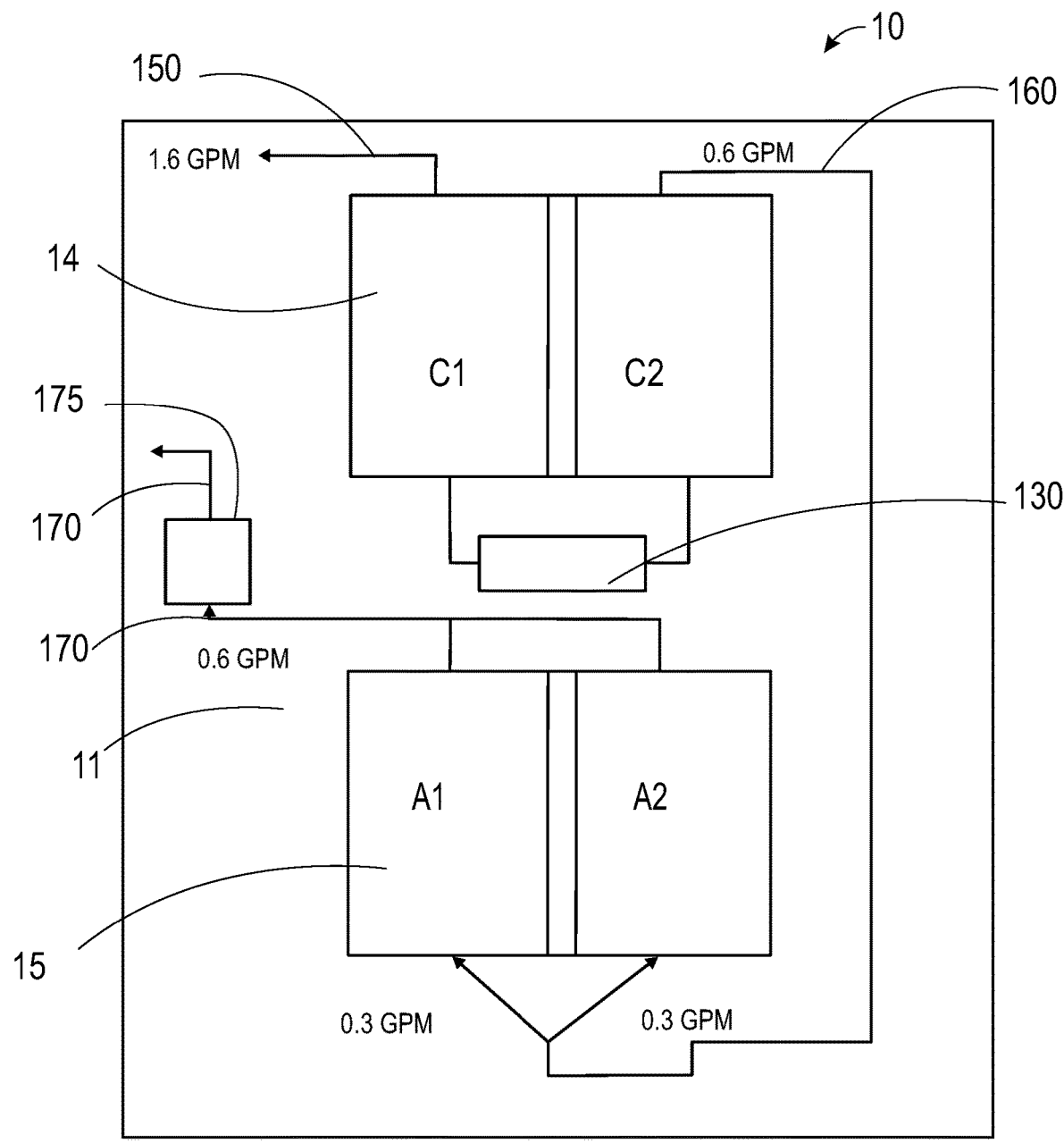
FIG. 15 is a flow diagram of an exemplary system.

FIG. 15 illustrates an exemplary embodiment of a system that includes exemplary flow rates. The cathode and anode cells 14, 15 have cathode and anode electrodes C1, C2, A1 and A2 as described above. A soft water supply 130 feeds the cathode electrodes C1 and C2. The cathode electrode C1 (i.e., a first cathode electrode) generates product 150 (i.e., alkaline electrolyzed water) at, for example 1.6 GPM, and the cathode electrode C2 (i.e., a second cathode electrode) generates an alkaline feed stream 160, which is routed to feed anode electrodes A1 and A2 (i.e., a first anode electrode and a second anode electrode). In the illustrated embodiment, anode electrodes A1 and A2 generate, for example, a total of 0.6 GPM of product 170 (acid electrolyzed water), the pH of which can be monitored by, for example, pH sensor 175.

Figure 16:
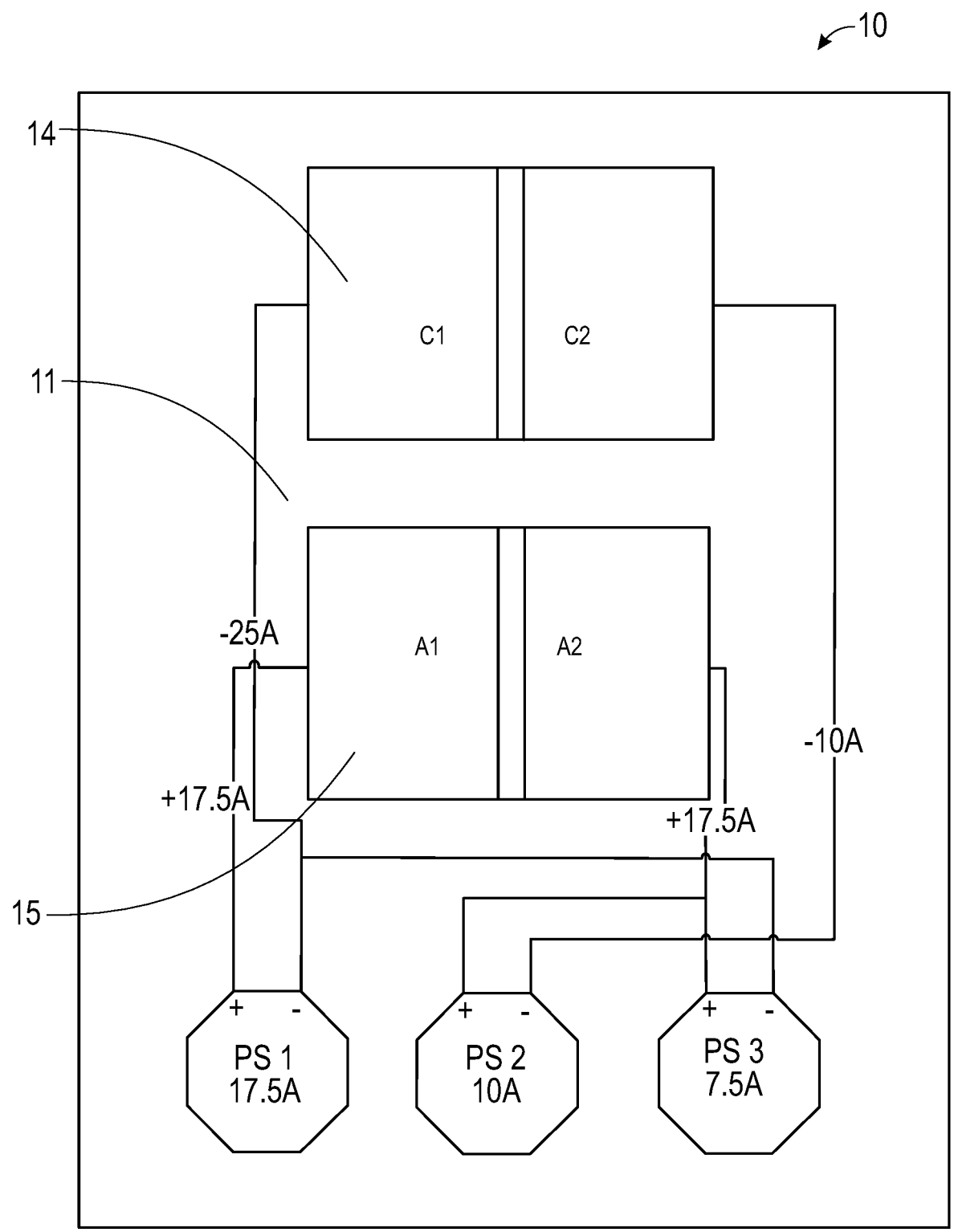
FIG. 16 is an electrical diagram of the exemplary system of FIG. 15.

In certain embodiments, cathode electrodes C1, C2 can be operated in a "staggered current" mode, which is depicted in FIGS. 15 and 16, particularly FIG. 16, which illustrates an exemplary electrical schematic for the embodiment of FIG. 15. For example, cathode electrode C1 can be operated at greater water flow rate and electrical current than cathode electrode C2, which may be done to drive greater production of product 150 (i.e., alkaline electrolyzed water). In certain embodiments, cathode electrode C1 is operated at a current of from about 2 to about 5 times greater than cathode electrode C2. As illustrated in FIG. 16, an example of staggered current is the following: cathode electrode C1 is operated at −25 A, while cathode electrode C2 is operated at −10 A, with corresponding positive current passing to an appropriate anode electrode(s). Another function of the "staggered current" mode is to relieve the total current placed on one anode electrode. The reduction and/or balance of current across two anodes allows for pH control of the alkaline electrolyzed water and/or the acid electrolyzed water. In certain embodiments utilizing staggered current mode, at least three power supplies (e.g., PS 1, PS 2, and PS 3) are connected to the cathode and anode electrodes C1, C2, A1, A2.

In the illustrated embodiments illustrated in FIGS. 15 and 16, the product of cathode electrode C1 150 is alkaline electrolyzed water and leaves the system. Product 150 and can be utilized as, e.g., alkaline cleaner. In certain embodiments, the system 10 is operated so as to produce a product of cathode electrode C1 (i.e., product 150) having a pH of from about 10 to about 13, including a pH of from about 11.5 to about 12.5, and a product of cathode electrode C2 (i.e., alkaline feed stream 160) having a pH of greater than 7, e.g., from about 8 to about 12.

In the illustrated embodiments illustrated in FIGS. 15-16, particularly FIG. 15, the product of cathode electrode C2 (i.e., alkaline feed stream 160) is routed to contact the surface of anode electrodes A1, A2 of anode electrolyzer cell 15. The flow of product of cathode electrode C2 may be split approximately evenly (e.g., 0.3 GPM) among anode electrodes A1, A2, which is illustrated in FIG. 15. When powered, the positive charge of anode electrodes A1, A2 draws negative ions (e.g., Cl−) from the brine solution of open brine bath 16 (e.g., FIG. 1), through anode anion permeable membrane 42 (e.g., FIG. 3), and into the flow of the product of cathode electrode C2, which forms acidic electrolyzed water (e.g., product 170). The sum of currents of anode electrodes A1, A2 balances the negative current supplied to the cathode electrodes C1, C2. For example, if the cathode electrodes C1, C2 are operated at a sum current of 35 A, then anode electrodes A1, A2 should be operated at a sum current of +35 A, for example, each anode electrode may be supplied with 17.5 A of current.

Supplying the cathode electrode product to the anode electrodes provides the benefit of increasing the pH of the anode product (i.e., the acid electrolyzed water) such that the anode product may have an optimum pH, e.g., of from about 4.5 to about 6, including from about 5.2 to about 5.5.

Figure 17:
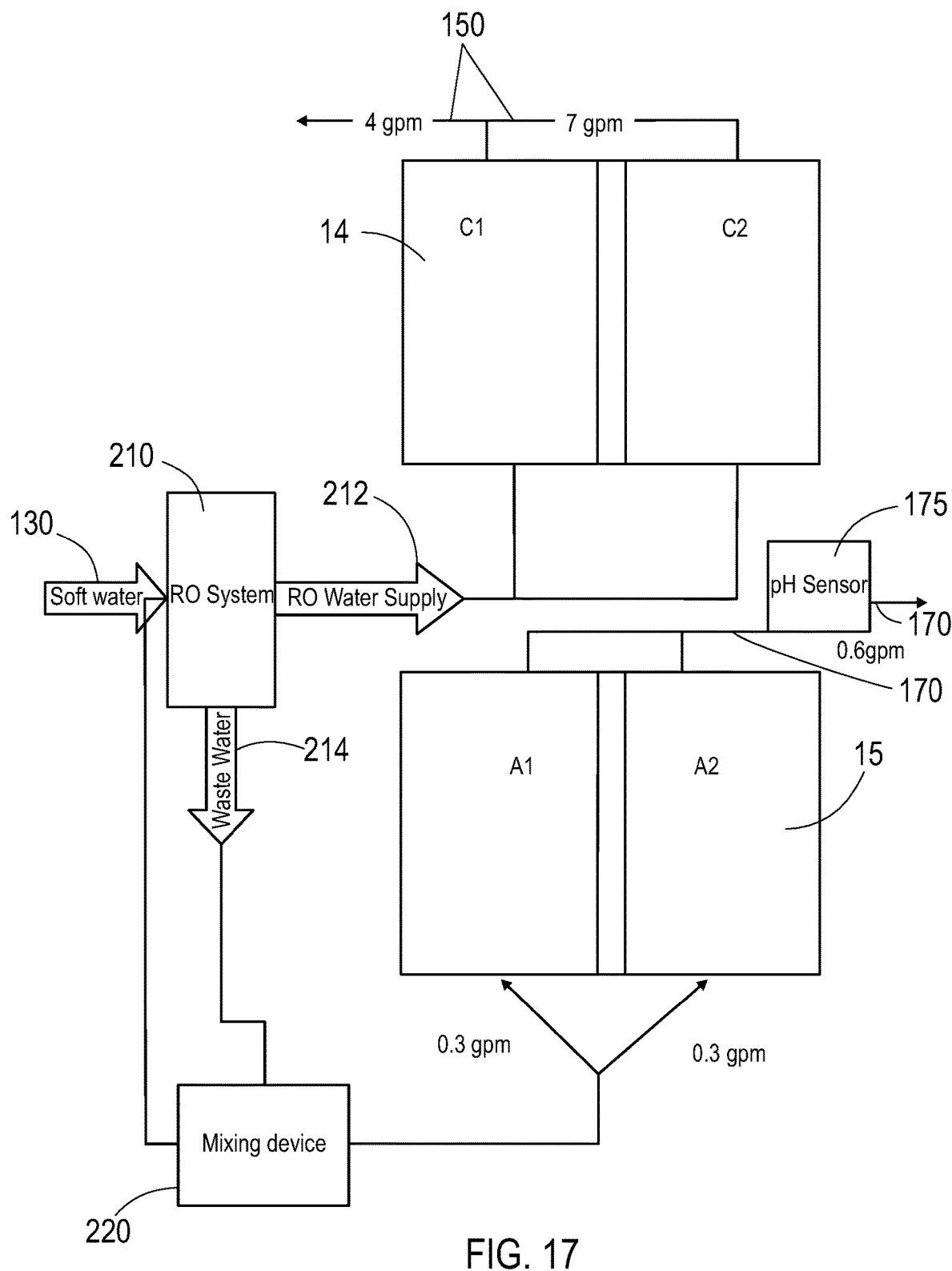
FIG. 17 is a flow diagram of a further exemplary system incorporating reverse osmosis.
Figure 18:
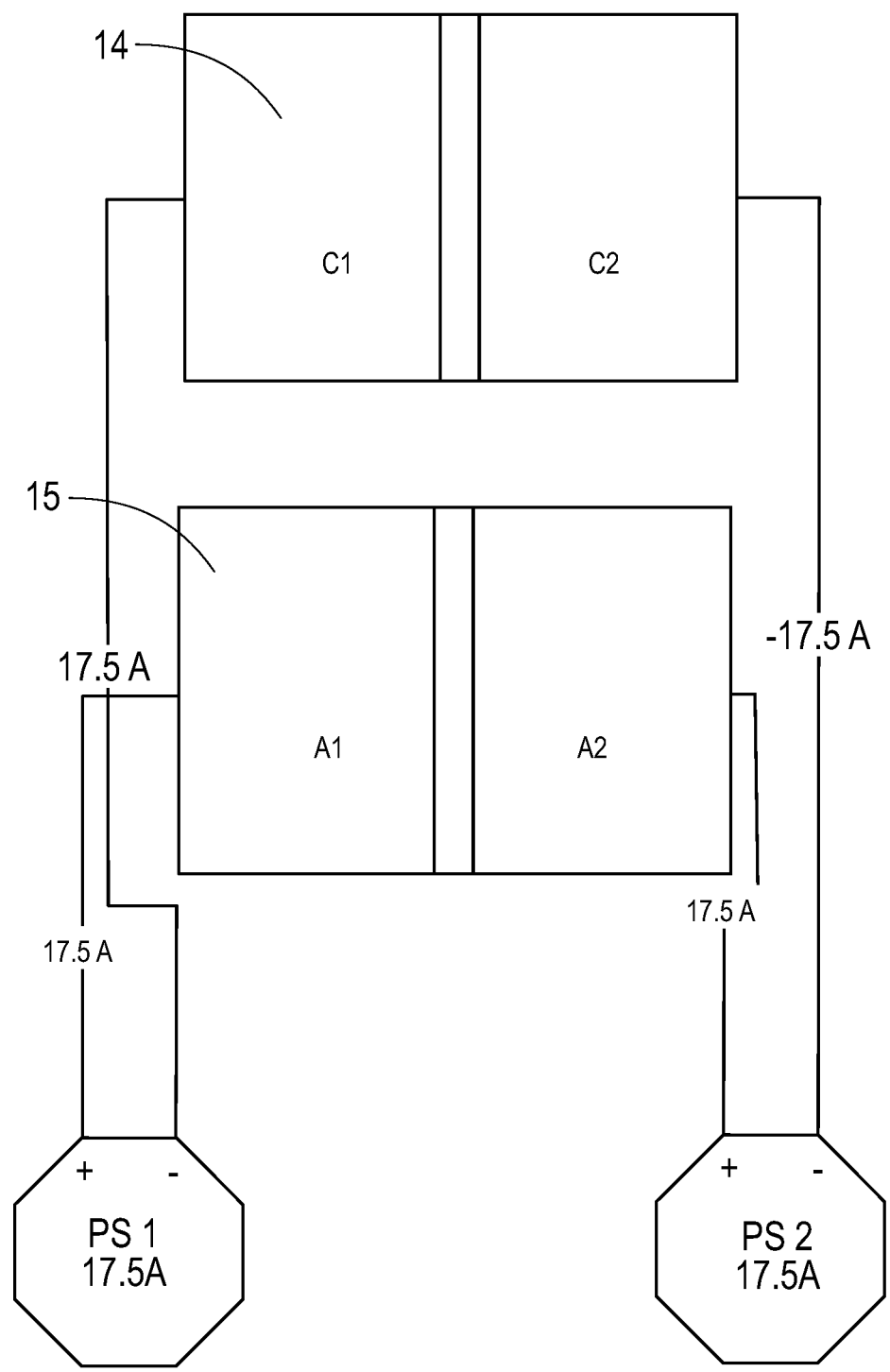
FIG. 18 is an electrical diagram of the further exemplary system of FIG. 17.

FIGS. 17 and 18 illustrate a further exemplary embodiment incorporating reverse osmosis (e.g., the reverse osmosis embodiment), a water supply passes through a water softening system, and providing soft water supply 130. The softened water passes through a reverse osmosis system 210. The product stream 212 of the reverse osmosis system 210 is supplied as feed water to the cathode electrolyzer cell 14 and contacting the cathode electrodes C1, C2, each of which are operated to produce product 150 (i.e., alkaline electrolyzed water). Unlike the embodiments of FIGS. 15 and 16, in the embodiments of FIGS. 17 and 18, none of the alkaline electrolyzed water of the embodiments of FIGS. 17 and 18 is sent to the anode electrolyzer cell 15 or contacted with the anode electrodes A1, A2. In certain embodiments, softened water from, e.g., the soft water supply 130 and backwash stream 214 from the reverse osmosis system 210 are combined (e.g., via a mixing device 220) and contacted with the anode electrodes A1, A2, thereby allowing for the reverse osmosis system 210 to be operated with essentially maximum efficiency in relation to use of water. When utilized, the configuration set forth in this paragraph FIGS. 17 and 18 can be operated with an even number of power supplies (e.g., two: PS 1 and PS 2) because the cathode and anode electrodes C1, C2, A1, A2 each can be operated at corresponding current operation (e.g., C1=17.5 A, C2=17.5 A, A1=+17.5 A, A2=+17.5 A), as opposed to staggered current operation described herein. Therefore, the electrical configuration of the reverse osmosis embodiment can be simple relative to the embodiments of FIGS. 15 and 16. Flow rates shown in FIGS. 15-18 are meant to be exemplary in nature and should not be construed as limiting.

From the foregoing, it can be seen that an electrolyzing system is provided that is operable for producing in an economical manner higher quantities of electrolyzed waters within prescribed pH ranges for optimum usage. The system comprises electrolyzer cells having a unique construction that enables increased production of electrolyzed water and which are operable for producing greater quantities of alkaline electrolyzed water than acidic electrolyzed water consistent with a users requirements. The cells further can be operate with staggered input currents and the redirection of electrolyzed water for optimum control of pH levels of the resulting alkaline and acidic electrolyzed products.

The invention claimed is:

1. An electrolyzing system for electrolyzing a brine solution of water and ions of an alkali salt to produce acidic electrolyzed water and alkaline electrolyzed water, the system comprising:
   a vessel for containing the brine solution comprising cations and anions and defining a brine bath;
   an electrolytic cartridge arranged in said vessel and immersed in the brine bath;
   said electrolytic cartridge comprising a cathode cell and an anode cell;
   said cathode cell including a pair of cathode electrodes connected to an electrical supply that negatively charges the cathode electrodes;
   a cathode electrode holder supporting said cathode electrodes in coplanar laterally spaced side by side relation to each other in respective chambers sealed from each other;
   at least one cation permeable membrane disposed on one side of each of said cathode electrodes defining a space between each cathode electrode and the cation permeable membrane through which cations from the brine solution can enter through the cation permeable membrane;
   said spaces between cathode electrodes and cation permeable membrane each being in communication with a fresh water supply inlet at an inlet end of the space and in communication with a cleaning chemical outlet at an outlet end of the space;
   said spaces between said cathode electrodes and cation permeable membrane being sealed off from each other and the brine solution such that the only path for the brine solution to enter the spaces is through the cation permeable membrane;
   said anode cell including a pair of anode electrodes connected to an electrical supply that positively charges the anode electrodes;
   an anode electrode holder supporting said anode electrodes in coplanar laterally spaced side by side relation to each other in respective chambers sealed from each other;
   at least one anion permeable membrane disposed on one side of said anode electrodes defining a space between each anion electrode and the anion permeable membrane through which anions from the brine solution can enter through the anion permeable membrane;
   said spaces between said anode electrode and anion permeable membrane each being in communication with a fresh water supply inlet at an inlet end of the space and in communication, with a cleaning chemical outlet at an outlet end of the space; and
   said spaces between said anode electrodes and anion permeable membrane being sealed off from each other and the brine solution such that the only path for the brine solution to enter the spaces is through the anion permeable membrane.

2. The electrolyzing system of claim 1 including at least one separator between said anion and cation permeable membranes separating the anion permeable and cation permeable membranes and permitting the passage of the brine solution from said brine bath to said anion and cation permeable membranes.

3. The electrolyzing system of claim 1 in which said cathode electrodes have greater surface areas than said anode electrodes.

4. The electrolyzing system of claim 3 in which said cathode electrodes comprise a pair of mesh plates fixed together in side by side relation, and said anode electrodes each comprise an uninterrupted flat plate.

5. The electrolyzing system of claim 4 in which said mesh plates are structurally and electrically connected together by an intermediate spacer plate, and said mesh plates each having a terminal coupled to the respective spacer plate and protruding from the cartridge housing.

6. The electrolyzing system of claim 1 in which said at least one cation permeable membrane is a single membrane disposed on one side of said cathode electrodes, and said at least one anion permeable membrane is a single membrane disposed on one side of said anode electrodes.

7. The electrolyzing system of claim 1 in which said cathode electrode holder forms a respective, pocket with said cathode electrodes that each defines an auxiliary liquid flow path in communication between the fresh water supply inlet and the chemical outlet of the cathode cell.

8. The electrolyzing system of claim 7 in which said pockets have a depth at least 2 times the spacing between the cation permeable membrane and the cathode electrodes.

9. The electrolyzing system of claim 2 in which said at least one separator supports said membranes in parallel relation to said electrodes during pressurized flow of liquid through the spaces between said membranes and electrodes.

10. The electrolyzing system of claim 9 in which said separator has liquid passages for permitting free circulation of brine solution from said brine bath to said anion and cation membranes for ion exchange through the membranes on each side of the separator.

11. The electrolyzing system of claim 7 in which said anode electrode holder defines an auxiliary liquid flow passage about an outer perimeter of the anode electrodes communicating between the fresh water inlet and the chemical outlet of the anode cell.

12. The electrolyzing system of claim 10 in which said at least one separator is a single separator plate disposed immediately between said anion and cation permeable membranes.

13. The electrolyzing system of claim 1 in which said fresh water inlet of said spaces between said cathode electrodes and cation permeable membrane are in communication with a product stream of a reverse osmosis system.

14. The electrolyzing system of claim 1 in which said fresh water inlet of said spaces between each anode electrode and anion permeable membrane are in communication with a backwash stream of a reverse osmosis system.

15. An electrolyzing system for electrolyzing a brine solution of water and ions of an alkali salt to produce acidic electrolyzed water and alkaline electrolyzed water, the system comprising:
- a vessel for containing the brine solution comprising cations and anions and defining a brine bath;
- an electrolytic, cartridge arranged in said vessel and immersed in the brine bath;
- said electrolytic cartridge comprising a cathode cell and an anode cell;
- said cathode cell including a first cathode electrode and a second cathode electrode connected to an electrical supply that negatively charges the cathode electrodes; said cathode electrodes being supported in coplanar laterally spaced side by side relation to each other in respective chambers sealed from each other;
- at least one cation permeable membrane disposed on one side of each of said cathode electrodes defining a first space between the first cathode electrode and the at least one cation permeable membrane, and a second space between the second cathode electrode and the at least one cation permeable membrane through which cations from the brine solution can enter through the at least one cation permeable membrane;
- said first and second spaces being in communication with a fresh water supply inlet at an inlet end of the first and second spaces, said first space having an outlet end being communication with a cleaning chemical outlet;
- said spaces between said cathode electrodes and cation permeable membrane being sealed off from each other and the brine solution such that the only path for the brine solution to enter the spaces is through the cation permeable membrane;
- said anode cell including at least one anode electrode connected to an electrical supply that positively charges the anode electrode;
- at least one anion permeable membrane disposed on one side of said at least one anode electrode defining a space between said at least one anode electrode and the anion permeable membrane through which anions from the brine solution can enter through the anion permeable membrane;
- said space between said at least one anion electrode and said anion permeable membrane having an inlet end being in communication with an outlet end of the second space between the second cathode electrode and the at least one cation permeable membrane, said space between said at least one anode electrode and said anion permeable membrane being, in communication with a cleaning chemical outlet at an outlet end; and
- said space between said at least one anode electrode and said at least, one anio permeable membrane being sealed off from each other and the brine solution such that the o y path for the brine solution to enter said space is through said anion permeable membrane.

16. The electrolyzing system of claim 15 including a cathode electrode holder supporting said cathode electrodes in coplanar laterally spaced side by side relation to each other.

17. The electrolyzing system of claim 16 including at least one separator between said anion and cation permeable membranes separating the anion permeable and cation permeable membranes and permitting the passage of the brine solution from said brine bath to said anion and cation permeable membranes.

18. An electrolyzing system for electrolyzing a brine solution of water and ions of an alkali salt to produce acidic electrolyzed water and alkaline electrolyzed water, the system comprising:
- a vessel for cc taming the brine solution comprising cations and anions and defining a brine bath;
- an electrolytic cartridge arranged in said vessel and immersed in the brine bath;
- said electrolytic cartridge comprising a cathode cell and anode cell;
- said cathode cell including a first cathode electrode and a second cathode electrode; said cathode electrodes being supported in coplanar laterally spaced side by side relation to each other in respective chambers sealed from each other;
- at least one cation permeable membrane disposed on one side of each of said cathode electrodes defining a first space between the first cathode electrode and the at least one cation permeable membrane, and a second space between the second cathode electrode and the at least one cation permeable membrane through which cations from the brine solution can enter through the at least one cation permeable membrane;
- said first and second spaces being in communication with a fresh water supply inlet at an inlet end of the first and second spaces;
- said spaces between said cathode electrodes and cation permeable membrane being sealed off from each other and the brine solution such that the only path for the brine solution to enter the spaces is through the cation permeable membrane;
- said anode cell including at least one anode electrode;
- at least one anion permeable membrane disposed on one side of said at least one anion electrode defining a space between each anode electrode and the anion permeable membrane through which anion from the brine solution can enter through the anion permeable membrane;
- said space between each anode electrode and said anion permeable membrane being in communication with, an aqueous supply and a cleaning chemical outlet at an outlet end;
- said spaces between said anode electrode and said anion permeable membrane being sealed off from each other and the brine solution such that the only path for the brine solution to enter the spaces is through said anion permeable membrane; and
- wherein the first cathode electrode is connected to negative terminals of a first and a second direct current power supply, the second cathode electrode is connected to a negative terminal of a third direct current power supply, and the at least one anode electrode is connected to positive terminals of the first, second and third direct current power supplies.

19. The electrolyzing system of claim 18 including a cathode electrode holder supporting said cathode electrodes in laterally spaced side by side relation to each other.

20. The electrolyzing system of claim 15 in which said anode cell includes a pair of said anode electrodes connected to an electrical supply that positively charges the anode electrodes;
- said anode electrodes be supported in coplanar laterally spaced side by side relation to each other in respective chambers sealed from each other;

said at least one anion permeable membrane being disposed on one side of said anode electrodes defining a space between each anode electrode and the at least one anion permeable membrane through which ions from the brine solution can enter through the anion permeable membrane, and the said spaces between each anode electrode and said at least one anion permeable membrane each having an inlet in communication with the outlet end of the second space between the second cathode electrode and the at least one cation permeable membrane.

21. The electrolyzing system of claim 18 in which said anode cell includes a pair of said anode electrodes; said anode electrodes be supported in coplanar laterally spaced side by side relation to each other in respective chambers sealed from each other; said at least one anion permeable membrane being disposed on one side of said anode electrodes defining a space between each anode electrode and the at least one anion permeable membrane through which ions from the brine solution can enter through the anion permeable membrane, and one of said anode electrodes being connected to the positive terminal of the first power supply and the other of said anode electrodes being connected to the positive terminals of the second and third power supplies.

* * * * *